UNITED STATES PATENT OFFICE.

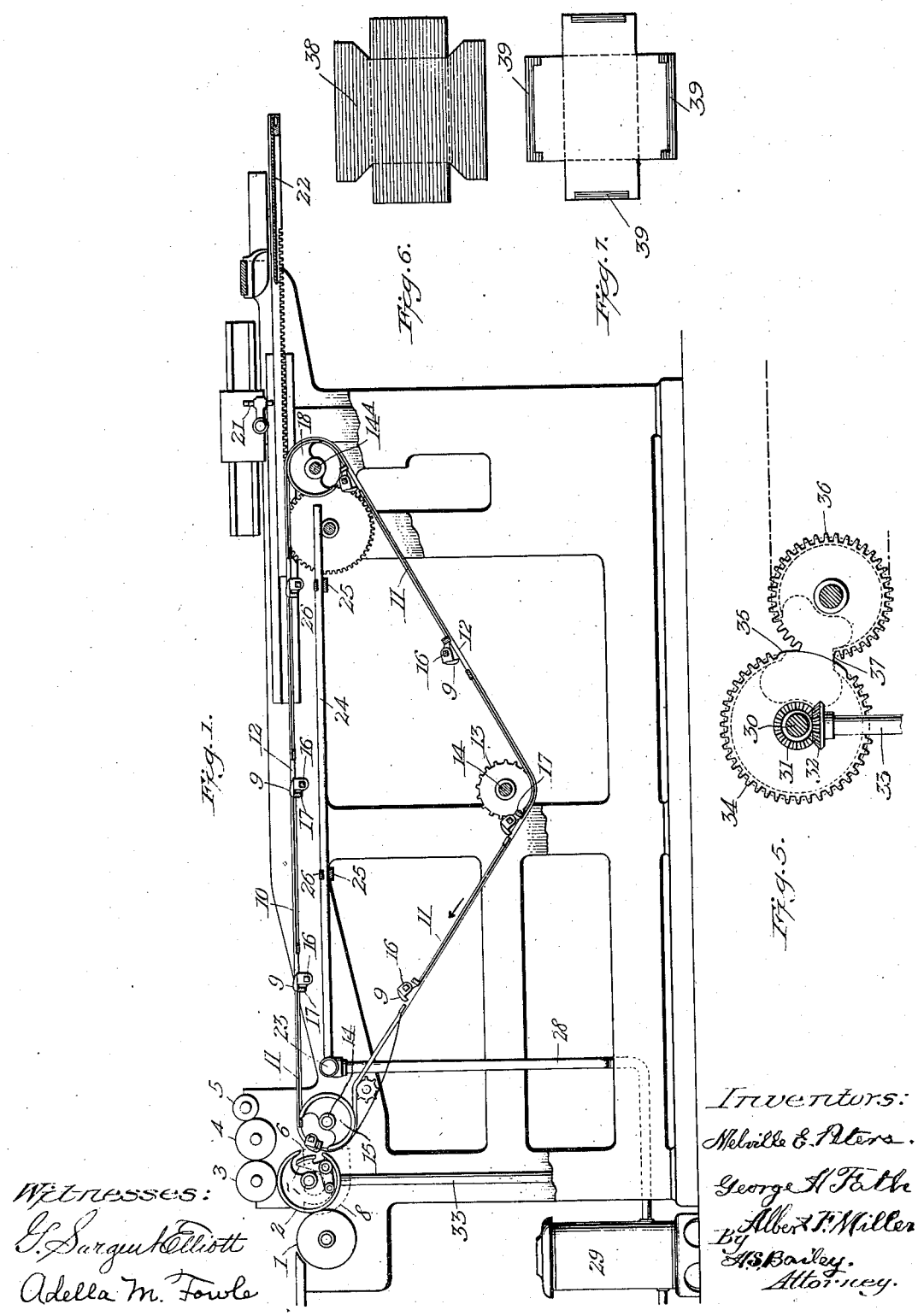

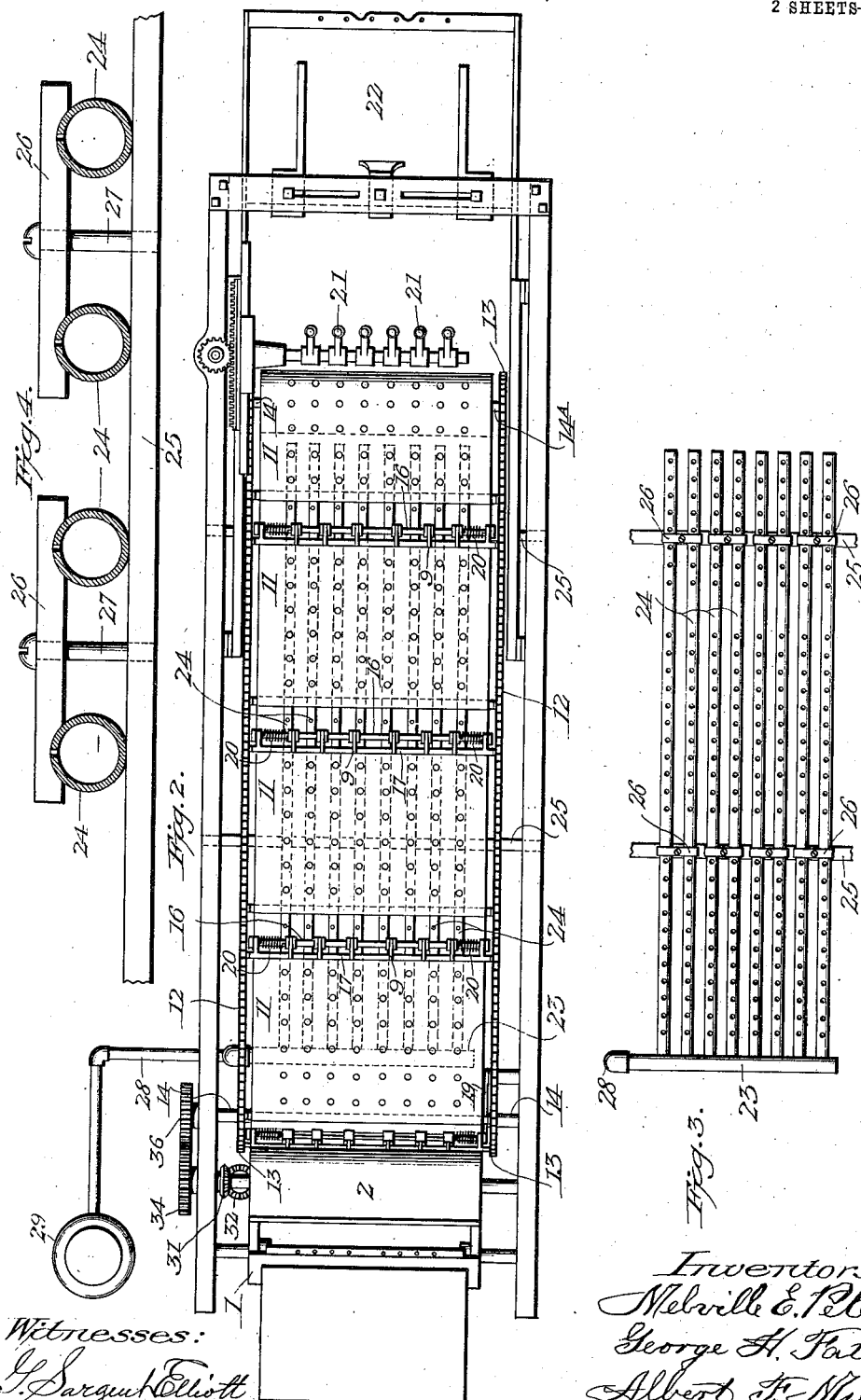

MELVILLE E. PETERS, GEORGE H. FATH, AND ALBERT F. MILLER, OF DENVER, COLORADO, ASSIGNORS TO THE PETERS PATENT RIGHTS COMPANY, OF DENVER, COLORADO, A CORPORATION OF COLORADO.

APPARATUS FOR NEUTRALIZING THE CURLING OF FRESHLY-GUMMED BLANKS.

1,251,812.   Specification of Letters Patent.   Patented Jan. 1, 1918.

Application filed April 28, 1916. Serial No. 94,203.

*To all whom it may concern:*

Be it known that we, MELVILLE E. PETERS, GEORGE H. FATH, and ALBERT F. MILLER, citizens of the United States of America, residing at the city and county of Denver and State of Colorado, have invented a new and useful Apparatus for Neutralizing the Curling of Freshly-Gummed Blanks, of which the following is a specification.

Our invention relates to an automatically operating apparatus for applying a moisture or dampening treatment that will neutralize the curling tendency of freshly gummed blanks or labels, and that will cause them to lie out flat, straight and smooth immediately after they leave their blank or label gumming means; and the objects of our invention are:

First, to provide a mechanism that will apply a moistening steam heat to the blanks immediately after they have received a coat of adhesive gum.

Second, to apply to freshly gummed blanks a moist steam heat, through the medium of a suitable blank supporting medium.

Third, to provide means by which blanks that have been freshly gummed on one side and have a tendency to curl are subjected to a moistening treatment on their opposite side from their freshly gummed side.

Fourth, to provide means by which box covering blanks or labels of paper, or other suitable material, can be either partially or wholly coated with a liquid gum or glue on one side, and then immediately afterward subjected to a treatment that moistens or dampens their opposite sides from their gum coated sides with a moist vapor of water or any other suitable liquid, but preferably the vapor of low pressure steam, that will neutralize the curling tendency of the freshly gummed blanks toward their gummed sides, and will cause them to lie out flat on a suitable support.

Fifth, to provide means by which box covering blanks or labels of paper, or other suitable material, can be either partially or wholly coated with a liquid gum or glue on one side, and then immediately afterward subjected to a treatment that moistens or dampens their opposite sides from their gum coated sides with a moist vapor of water or any other suitable liquid, but preferably the vapor of low pressure steam, that will neutralize the curling tendency of the freshly gummed blanks toward their gummed sides, and will cause them to lie out flat on a suitable support, and means for delivering said neutralized blanks in positions to receive unwrapped boxes directly against their gummed sides in blank covering or wrapping relation.

Sixth, to provide an automatically operating apparatus for feeding, coating with liquid gum or glue, conveying from the gum coating means, and especially for neutralizing the curling tendency of freshly gummed blanks to curl after being coated with liquid gum or glue, and to deliver said blanks with their gummed sides uppermost into box receiving registering and covering relation to said blanks, either upon the blank gumming machine or into an independent box covering and wrapping machine. And Seventh, to provide automatic blank or label feeding gumming conveying and box registering mechanism in which each blank immediately after it has been freshly gummed on one side is treated with a low pressure steam moist vapor under sufficient pressure to moisten and dampen with sufficient moistening treatment to take out the tendency of the blank to curl and will neutralize the moisture on both sides of the blank to neutralize the tendency to curl in either direction, and will thus cause the blank to lie flat on its supporting members as it is conveyed to box registering and wrapping treatment.

We attain these objects by the mechanism illustrated in the accompanying drawings, in which:

Figure 1, is a side elevation partly in section, of a blank moistening mechanism embodying our invention.

Fig. 2, is a plan view of the same.

Fig. 3, is a plan view of the steam pipes which deliver the moist steam to the under side of the blanks carried by the conveyer.

Fig. 4, is a transverse sectional view—full size—of four of the steam pipes showing the manner of connecting them in pairs to a supporting bar.

Fig. 5, is a detail sectional view, showing the gearing by which the intermittent movement of the conveyer is effected.

Fig. 6, is a plan view of a tight-wrap blank. And

Fig. 7, is a plan view of a loose-wrap blank.

Similar letters of reference refer to similar parts throughout the several views.

In the art of gumming the blanks or labels that are to be used to wrap what are known as box-shells, which are common pasteboard boxes which have their corners either stayed or unstayed, the blanks are fed by preferably automatic operating blank feeding mechanism to a feed roller 1, from which and by which it is fed to a gumming cylinder 2. This cylinder is entirely covered with a suitable adhesive gum that is fed to it by properly regulated gum feeding rolls 3, 4 and 5, that are positioned above it. This blank gumming roller is provided with an openable and closable gap 6, that is closed by a segment 7, which is automatically moved back into the cylinder at a predetermined point in the cylinder's rotary movement, by a cam 8, that draws the segment back into the cylinder and opens the gap which exposes the edge of the blank. The advancing edge of the blank is exposed when the gap opens, as the feed roller delivers the advancing edge of the blank onto the gumming cylinder, so that it laps onto the edge of the segment, to the gummed surface of which it sticks, and the rest of the blank feeds onto the gum coated surface of the cylinder as the cylinder rotates, it being pressed against the surface of the cylinder by the feed roller; then when the cylinder rotates to a predetermined point the segment is moved back into the interior of its cylinder by its cam, thus moving the segment 7 away from the advancing edge of the blank which is now exposed and left unsupported in the gap of the cylinder.

This exposed edge of the blank is then gripped by a set of gripping fingers 9, that form a part of an endless conveyer 10. This conveyer 10 consists of a plurality of blank supporting aprons 11, that are carried by sprocket chains 12, the advancing edge of each apron being provided with a set of the blank gripping fingers 9.

We preferably show eight of these blank supporting aprons in this endless conveyer. The aprons and chains are supported on sprocket wheels 13, that are mounted on shafts 14 and 14$^A$. These shafts are driven by mechanism that is illustrated in Fig. 5. On the shaft 14 a gapped cylinder 15 is secured, on which one end of the conveyer is mounted and around which it turns upwardly as each set of finger grippers grip a blank and rollingly deposit it upon their apron. These aprons are preferably made of rubberized cloth though they may be made of any other suitable material, and their surfaces are perforated with apertures of about a quarter of an inch in diameter, and that are positioned at a short distance apart. Each apron is made large enough to support upon its surface the largest size blanks the feed and gumming rolls will feed and gum, and each apron has, at its advance feeding end, a set of the blank grippers 9, which are mounted on a shaft 16, which is positioned transversely across the apron, and are mounted in bearings formed on a transverse bar 17, which is secured at its ends to the sprocket chains 12. Each set of finger grippers is arranged to grip the blanks against the bar 17 in the gap of the gumming cylinder.

This endless conveyer has a short intermittent start and stop movement, the length of the movement being equal to the length of the aprons between the center of one set of grippers 9, and the center of the next set of grippers. The aprons turn around a cylinder 18 on the shaft 14$^A$, and the chains and consequently the cylinders 15 and 18 are caused to stop as each apron reaches the cylinder 18. This stopping period affords time for each blank to be removed from the conveyer at this point, which we call the blank transferring station of the conveyer, and at this stopping and blank transferring station the grippers are moved to release the blanks, and are locked in their opened position until they have traveled back along the under side of the conveyer to the gapped transmission cylinder, where they are released by a cam (not shown), and when released each set of grippers is thrown over the exposed edge of the blank in the gap of the gumming cylinder by springs 20, with which each gripper supporting bar 16 is provided. At the blank stopping and transferring station of the conveyer a transverse set of air suction tubes 21 moves down onto the blank and grips its edge as the grippers release it, and these air suction tubes first lift the blank and then forward it and deposit it on a reciprocating table 22, which delivers it to a box-wrapping machine, or to a box registering plunger that is mounted on the gumming machine, that registers the box against the freshly gummed blank while it is on the table 22, of the gumming machine. Or, if desired, an attendant may place the boxes on the freshly gummed blanks while they are still on the delivery table of the gumming machine.

A description of the details of construction of the above briefly described blank gumming machine will be found in our application, Serial Number 30,471, filed May 25, 1915, for a blank gumming machine, now Patent 1,239,815, and our applications Nos. 68,270 and 94,206, filed Dec. 22, 1915, and Apr. 28, 1916, respectively, now Patents 1,223,516 and 1,226,997.

The blanks feed off from the gumming cylinder with their gummed sides uppermost, and they remain in this position as they feed through the machine, and they are in this position when the box is moved down against them. The instant the blanks feed off from the gumming cylinder they commence to curl up from their opposite ends, and if some means were not quickly employed to eradicate, remove and destroy their curling tendency and to straighten them out, they would be so badly curled up as to be unsealable, and it is the essential object of our invention to provide means for substantially and instantly permanently removing their curling tendency and to straighten them out flat on their aprons in a condition in which they will stay out flat, soft and limp until they are completely wrapped around the box that is brought in registering relation to them.

To this end, we employ a device which is constructed and arranged as follows:

Fig. 1 of the drawings is a side elevation of the main elements of a blank gumming machine, such as is illustrated in our above mentioned patent, showing that portion of the machine in section where our blank moistening mechanism is located. In this, as well as the other figures, the numeral 23 designates a moist steam conveying pipe of capacity enough to provide as large a volume of moist steam as is necessary to thoroughly saturate and wilt the gummed blanks. This pipe extends transversely across the gumming machine between the frames, and adjacent to the cylinder 15, and to this pipe is connected a plurality of small pipes 24, which extend parallel with the length of the machine, and to within a short distance of the transferring cylinder 18.

We employ several of these small pipes, which we call steam discharging pipes, along and under the aprons and parallel with them, spacing them about two inches apart, and in the width of the aprons we preferably place about eight pipes. The pipes 24 may be secured beneath the upper lap of the conveyer, in any suitable manner, but in the accompanying drawings they are arranged as follows: Two bars 25 extend from one side of the frame of the machine to the other, and are bolted at their ends to the under edges of the uppermost horizontal members of the frame, as shown by Fig. 1, in position to support the steam discharge pipes 24, in a horizontal plane. Each pair of the eight pipes 24 are secured to the bars 25, so as to be held against lateral movement, by saddle blocks 26, which are recessed on their under sides to receive the pipes, as shown by Fig. 4, and which clamp the pipes to the bars 25; screws 27 being passed through each block between the pipes and screwed into the bar 25, thus securely holding the pipes in place.

To one of the ends of the main supply pipe 23, is connected one end of a pipe 28, the other end of which is connected with any suitable supply of low pressure moist steam, such as a portable heater or a steam pipe line. We preferably, however, employ in the practical operation of our invention a small boiler 29, the water in which we heat by means of a gas jet which is located underneath it. This boiler is provided with a supply of water which generates the moist steam necessary for the proper moistening of the under side of the blanks through the perforated aprons, and to saturate the unperforated portions of the aprons through to their top surfaces with sufficient moisture to thoroughly wilt, soften and render perfectly limp the gummed blanks.

The small steam discharging pipes 24, are each provided along their top surfaces with a continuous row of small steam outlet apertures, which are preferably about a sixteenth of an inch in diameter. The steam outlet apertures of each of these small pipes, however, do not extend in a continuous row along the whole length of the pipes. They are divided into sets and each set is positioned to come directly under one apron of the top line of aprons when they are at a standstill, three aprons being exposed at each pause of the conveyer. Consequently there will be a set of these steam emitting apertures of each pipe under each three aprons as they come to a stand-still between the cylinders 15 and 18. The apron that travels up over the transmission cylinder from the gumming cylinder does not receive any steam until it commences to leave the transmission cylinder in a substantially straight horizontal line. Then as it moves away from the top of the gap transmission cylinder it moves over the first or nearest moist steam emitting apertures of the adjacent set of steam emitting apertures, and after it has moved over this first set of steam emitting apertures it stops, and standing still it receives a cloud of moist steam, which rises up through the perforations in the aprons directly against the ungummed side of the blank, and this moist steam softens and wilts the blank and also eliminates all tendency of the blank to curl. Each blank consequently moves intermittently over each set of the moist steam discharging apertures, before it arrives at the blank stopping and transferring station, and it receives at each stop the full charge of moist steam from all of the sets of tubes of all of the pipes extending under the aprons and parallel with them. Consequently by the time each blank has arrived at the blank stopping and transferring station of the conveyer it is so thoroughly moistened that there is no tendency to curl left in it and it will lie out flat and smooth and straight on any surface onto which it may be fed.

The steam used should be so moist as to be practically a vapor, and it should have only pressure enough to cause it to flow straight up against the bottom of the aprons, and it is preferably kept flowing steadily when the machine is running.

Our present invention contemplates any means by which the natural tendency of the freshly gummed blanks to curl is thoroughly eliminated, and they are rendered soft and pliable enough to lie out flat, straight and smooth on the blank delivering table.

An intermittent rotary movement may be imparted to the conveyer in any suitable manner, but as illustrated this feature is accomplished in the following manner: The shaft 30 of the gumming cylinder has secured thereon a bevel gear 31, which meshes with a bevel gear 32, on a power driven shaft 33, and by this means motion is transmitted to the gumming cylinder and its shaft 30. On one end of this shaft 30 is rigidly mounted a gear wheel 34, a portion of the circumferential edge of which is untoothed, as shown at 35, Fig. 5. The gear wheel 34 meshes with a gear wheel 36 on the shaft 14 on which the transmission cylinder 15 is mounted, and also the sprocket wheels 13, which carry the conveyer supporting chains 12; this gear wheel 36 has an untoothed portion 37, which is in sliding engagement with the untoothed portion 35 of the gear wheel 34. Thus, by reference to Fig. 5, it will be seen that as the gear wheel 34 rotates, its motion is imparted to the gear wheel 36, which turns with the wheel 34, until the untoothed portion 35 thereon engages the corresponding portion 37, on the said wheel 36, when the wheel 36 ceases to rotate, and remains at rest during the period in which the part 35 slides upon the part 37, immediately following which the teeth of the two gears 34 and 37 again mesh, and the wheel 36 is again rotated until their untoothed portions are brought into engagement again. This pause in the rotation of the gear 36 causes the intermittent movement of the conveyer, the pause being long enough to permit the air suction tubes 21 to engage and lift a blank from the adjacent apron, after which the conveyer is again started in the manner before described, and the blank carried by the suction tubes 21 is deposited upon the table 22.

In Figs. 6 and 7 we have illustrated tight-wrap and loose-wrap blanks respectively, the whole surface of the tight-wrap blank being gummed, as shown at 38, while only a portion of the edges of the end and side flaps of the loose-wrap blank is gummed, as shown at 39.

The operation is as follows:

The machine is preferably started up and allowed to run a few seconds with the moist steam turned on so as to thoroughly moisten the aprons before the blanks are started to be gummed. The steam is allowed to flow continuously from the boiler to the main supply pipe 23, and from it through the small tubes, from which the steam, with such water as has condensed from it, flows back to the boiler and continuous jets of steam flow upwardly from all of the steam discharging apertures of the set of small tubes against the under side of the aprons and up through the apertures of the aprons, against the bottom of the dry side of the blank, and by the time the blank reaches its transmitting station the amount of curl that has formed in it when it was gripped at the gap of the gumming cylinder and carried to over the transmission cylinder to where it first comes in contact with the moist steam of the steam distributing pipes has entirely disappeared, as the instant the moist steam strikes the dry side of the blank this curl, which is in the end portions, commences to unroll and the curled-up ends drop back until they lie out flat against the apron, and by the time they have been subjected to the successive applications of the steam to and while at their blank transmission station, they are perfectly limpid and are entirely devoid of any curling tendency, and it is necessary that they should be in this limpid condition in order that they may lie out perfectly flat, smooth and straight on the blank delivery table, in position to be quickly and evenly wrapped around the box that is fed to them.

Our invention provides a reliable, positively operating method of permanently eradicating the curling tendency of freshly gummed blanks, and while we have illustrated the preferred construction and arrangement of the apparatus we preferably use in carrying out our invention, we do not wish to be limited to it, as many changes might be made without departing from the spirit of our invention.

Having described our invention, what we claim as new and desire to secure by Letters Patent, is:

1. An apparatus for neutralizing the curling of freshly gummed blanks, comprising blank feeding and gumming mechanism arranged and adapted to apply a fresh coat of gum to one side of box covering blanks, means including moist vapor generating and discharging mechanism arranged to deliver the moist vapor against the opposite sides of the freshly gummed blanks from their gummed sides, and means including a conveyer arranged to receive the freshly gummed blanks from their gumming mechanism and adapted to feed them into operative moist vapor receiving relation to said moist vapor generating and discharging mechanism.

2. An apparatus for neutralizing the curling of freshly gummed blanks, comprising blank feeding and gumming mechanism, means including moist vapor generating and discharging mechanism arranged to discharge the moist vapor against the opposite sides of freshly gummed blanks from their gummed sides, means including a conveyer arranged to receive the freshly gummed blanks from their gumming mechanism, and arranged to feed said blanks over said moist vapor discharging mechanism, said conveyer being intermittently driven and provided with gummed blank holding members spaced at predetermined distances apart, and means for discharging the moist vapor continuously against the opposite side of said blanks from their gummed sides during the stop periods of their intermittent traveling movement, and means for discharging said neutralized blanks from said conveyer.

3. An apparatus for neutralizing the curling tendency of freshly gummed blanks, said apparatus comprising means including blank feeding and gumming mechanisms adapted to apply a coat of gum to the top side of said blanks, and an endless blank supporting conveyer, and means including a group of perforated piping arranged to apply to the ungummed side of the blanks a continuous flow of moist low pressure steam for a predetermined period of time.

4. In an apparatus for neutralizing the curling tendency of freshly gummed blanks, means including an endless conveyer having an intermittent movement, and parallel rows of perforated piping placed below said conveyer and arranged to discharge the combined heat and moisture of low pressure steam to the blanks as they are conveyed over said piping.

5. The herein described apparatus for neutralizing the curling tendency of freshly gummed blanks, which consists of an endless intermittently moving perforated apron conveyer provided with blank gripping fingers and means including a plurality of perforated pipes arranged to flow a volume of low-pressure moist steam in the form of jets through said perforated aprons.

6. The herein described apparatus for neutralizing the curling tendency of freshly gummed blanks, which consists of operative blank feeding and gumming mechanism, and an endless intermittently moving perforated apron conveyer, provided with gummed blank gripping fingers, arranged to grip the blanks at their gumming mechanism, and transfer them to the aprons of said conveyer, and means including a plurality of perforated pipes arranged to flow a volume of low pressure moist steam in the form of jets through said perforated aprons against the ungummed sides of said blanks while they are being conveyed away from their gumming mechanism.

7. The herein described apparatus for neutralizing the curling tendency of freshly gummed blanks to curl immediately after they leave their gumming mechanism, said apparatus comprising a conveyer adapted to receive and support the blanks, said conveyer being provided with perforated aprons arranged to receive the blanks from their gumming mechanism, a plurality of steam pipes arranged below said aprons and provided with rows of apertures arranged to direct jets of steam against the bottom of the blank through the apertures in said apron.

8. The herein described apparatus for neutralizing the curling tendency of freshly gummed blanks to curl immediately after they leave their gumming mechanism, said mechanism comprising an operative gumming mechanism, a conveyer adapted to receive and support the blanks, said conveyer being provided with perforated aprons arranged to receive the blanks from their gumming mechanism, a plurality of steam pipes arranged below said aprons and provided with rows of apertures arranged to direct jets of steam against the bottom of the blank through the apertures in said aprons and means for connecting said steam discharging pipes to a supply of low pressure moist steam of moderate temperature, said aprons being provided with blank gripping fingers arranged at the head of each apron and arranged to grip each blank at its gumming mechanism and draw it onto its adjacent apron, and means including a small steam generating boiler positioned adjacent to said steam discharging pipes and connected thereto in such a manner that the steam will circulate through said pipes from said boiler and back to said boiler.

9. In an apparatus for neutralizing the curling tendency of freshly gummed blanks, the combination of the intermittent movement apron conveyer with the main steam supply pipes and the plurality of steam discharging pipes that extend along the conveyer under the aprons, said main steam supply pipes being provided with a steam inlet and steam outlet pipes and means including a steam generating boiler operatively connected to said steam inlet and outlet pipes.

10. In an apparatus for neutralizing the curling tendency of freshly gummed blanks to curl toward their freshly gum-coated side immediately after they leave their gumming mechanism, the combination of the conveyer, said conveyer being provided with blank supporting aprons and with blank gripping fingers for gripping and holding said blanks on said aprons, said aprons being made of flexible, impervious material and being provided with numerous perforations, with a plurality of steam discharging pipes arranged under said aprons, said pipes being provided with rows of small steam jet discharging apertures, the row of each pipe being arranged in sets of several holes in a set, means for stopping the aprons over each set of steam discharging apertures, and for advancing said aprons by intermittent step movements over all of the sets of steam discharging apertures of the plurality of pipes under said aprons, said pipes being provided with a steam inlet pipe, and a steam generating boiler connected to said inlet pipes.

11. The herein described apparatus for neutralizing the curl of freshly gummed blanks, which consists of an operative blank feeding, blank gumming and blank conveying mechanism, said conveying mechanism carrying aprons and each apron consisting of a fabric, which is provided with means including blank gripping fingers adapted to grip said blank and transmit it from the gumming mechanism onto the conveyer, each apron of said conveyer being provided with numerous apertures extending through it, which are positioned under the blanks when they are lying on them, and means including a plurality of perforated moist steam discharging pipes positioned under said aprons, the perforations of which are arranged to discharge the steam in jets against the bottom of a predetermined number of said aprons and against the dry under side of the blanks lying on them through the perforations in said aprons, and means for discharging moist steam against the bottoms of said aprons while being conveyed away from said blank gumming mechanism.

12. The herein described combination of the blank feeding and blank gumming mechanism, with the conveyer, the rubberized cloth aprons thereon and their blank gripping fingers, said conveyer being provided with an intermittent movement equal to the distance between the blank supporting areas of said aprons, said blank supporting aprons being adapted to receive and convey said blanks from said gumming mechanism to their discharging station, said aprons having perforations extending through them, and the plurality of perforated steam discharging pipes under and along the under side of said blank conveying aprons, said pipes being arranged to discharge jets of moist low pressure steam against the under side of said aprons and through their perforations against the under and dry side of said blanks, and means for operatively connecting said steam discharging pipes with a continuously circulating supply of low pressure moist steam, whereby said blanks are rendered soft, limpid and in condition to be transferred from said conveyer to a blank delivery and box registering table.

13. The herein described apparatus for neutralizing the curling tendency of freshly gummed blanks, which consists of a conveyer carrying aprons arranged to receive against their upper surfaces the dry ungummed side of freshly gummed blanks, said aprons being provided with numerous perforations throughout their blank supporting surfaces, a low pressure moist steam continuously circulating system of pipes arranged parallel with and under said apron conveyer, said pipes being provided with rows of steam discharging apertures arranged to discharge jets of steam against the under sides of said aprons and through their perforations against the ungummed side of each blank on each apron until each blank is soft, limpid and in such a straightened-out, flat condition as to be transmitted to a box delivering and registering table.

In testimony whereof we affix our signatures in presence of two witnesses.

MELVILLE E. PETERS.
GEORGE H. FATH.
ALBERT F. MILLER.

Witnesses:
G. SARGENT ELLIOTT,
ELIZABETH SMITH.